United States Patent [19]

Kinyon

[11] Patent Number: 4,978,403

[45] Date of Patent: Dec. 18, 1990

[54] TIRE REPAIR METHOD USING SOLID MANDREL HALVES

[75] Inventor: Larry R. Kinyon, Roanoke Rapids, N.C.

[73] Assignee: Myers Industry, Akron, Ohio

[21] Appl. No.: 399,850

[22] Filed: Aug. 29, 1989

[51] Int. Cl.$^5$ .................. B29C 35/02; B29C 73/06
[52] U.S. Cl. .................... 156/97; 156/115; 156/293; 425/11; 425/23; 425/26; 264/326; 152/367
[58] Field of Search ............ 156/94, 95, 96, 97, 156/156, 115, 293, 294; 425/11, 14, 15, 16, 20, 23, 26, 27, 49, 50; 81/15.2, 15.5, 15.6, 15.7; 152/367; 264/326, 516, 565; 249/184

[56] References Cited

U.S. PATENT DOCUMENTS

| | | | |
|---|---|---|---|
| 2,944,290 | 7/1960 | Feist et al. | 425/27 |
| 3,038,203 | 6/1962 | Gross | 425/26 |
| 3,327,351 | 6/1967 | Alm | 425/14 |
| 3,940,463 | 2/1976 | Nicholson | 156/97 |
| 4,708,608 | 11/1987 | DiRocco | 156/97 |
| 4,720,313 | 1/1988 | Wegehaupt | 156/97 |

Primary Examiner—David L. Lacey
Assistant Examiner—Todd J. Burns
Attorney, Agent, or Firm—Oldham & Oldham Co.

[57] ABSTRACT

A tire repair method includes assembling a harness having straps, a first (or outside) air bag and a first (or outside) heating pad, placing a tire having an area in need of repair so that the repair site is over the heating pad and the tires axis of rotation is parallel to the harness straps, then inserting a second (or inside) heating pad and a second (or inside) air bag on the inside of the tire, and finally putting in place a pair of complementary mandrel halves of the same size. These mandrel halves when in place overlie the repair area of the tire and the other items of equipment. Each mandrel half includes a top surface (which is placed in proximity with a tire bead), a convex outside surface which generally has the same contour as that of the inside of the tire sidewall, a flat inside surface, a bottom surface which is preferably convex, and two ends. The respective flat inside surfaces of the two mandrel halves are placed in touching engagement with each other so that these two surfaces are squarely aligned. The mandrel halves and the tire sidewall exert force against the rest of the assembly to hold the assembly in place while repair is taking place.

5 Claims, 3 Drawing Sheets

4,978,403

TIRE REPAIR METHOD USING SOLID MANDREL HALVES

TECHNICAL FIELD

This invention relates to methods for repairing tires and to equipment used therein.

BACKGROUND ART

Tubeless tires have largely replaced tires with inner tubes for virtually all sizes of tires, ranging from passenger car tires to large tires used on off-road vehicles such as tractors and graders. It is necessary to maintain an air-tight tire casing, which means that any punctures which occur must be repaired or else the tire must be replaced. It is particularly important to repair rather than replace large tires for off-road vehicles where possible, because of the cost of such tires and the frequency with which punctures occur, due to severe conditions of use.

Patch compounds and techniques for tire repair are well known. For example, it is known that a tire having a puncture can be repaired by applying a patch compound to the puncture side, applying pressure by means of air bags on both the inside and outside of the tire at the repair side, and applying heat sufficient to vulcanize the patched material. Various patch compounds are known; a representative compound comprises rubber reinforced with nylon fibers. A problem occurs with respect to application of pressure to the inside of the tire because of the large space from the inside of the tire to the bead set. Heretofore, various methods have been used to fill the gap such as various mandrels or space filling material which is cumbersome and time consuming to insert and remove, difficult to adjust in size and generally hard to utilize. A further difficulty with presently known techniques is that they do not apply uniform pressure which can be sustained for at least sufficient time to permit the patch compound to cure.

DISCLOSURE OF THE INVENTION

This invention according to one aspect thereof provides a method for repairing a tire. This method comprises:

(a) Placing on an essentially horizontal supporting surface (e.g., a floor) a harness having a pad;

(b) Placing an air bag and a heat pad in that order on top of the harness pad;

(c) Positioning a tire to be repaired on top of said harness, air bag and heat pad so that the area of the tire to be repaired is over said heat paid, said area to be repaired having an uncured patch composition applied thereto;

(d) Placing on the inside of the tire, over the area to be repaired, a second heat pad, a second air bag and a pair of complimentary mandrels in the order named, said mandrel halves together extending from one sidewall to the other sidewall of the tire;

(e) Securing the resulting assembly of said harness, air bags, heat pads and mandrel halves snugly; and (f) Applying heat and pressure sufficient to cure said patched composition.

This invention according to another aspect provides a rigid mandrel for use in tire repair. This rigid mandrel comprises of pair of complimentary mandrel halves, each comprising a top surface, a convex first side surface having a contour essentially corresponding to that of the inside surface of a tire sidewall adjacent to the bead portion thereof, an essentially flat second side surface opposite said first side surface, a bottom surface and a pair of end surfaces. Mandrel halves of this type are intended to be used in pairs, with the second side surfaces in contact with each other. A pair of mandrel halves to be used together are mirror images having the same size.

This invention according to the third aspect provides a set of mandrel halves of different size to fit the insides of tires of different sizes, but of generally similar shape as above described. This set of mandrels includes two sub-sets, each sub-set having the same number of mandrel halves and the same sizes of mandrel halves, so that two mandrel halves of the same size (i.e., whatever size is needed to fit the tire to be repaired) can be used together.

BRIEF DESCRIPTION OF THE DRAWINGS

In the Drawings:

Referring now to FIG. 1, 10 is a harness having a flexible, heat resistant and abrasion resistant first pad 12, a plurality of parallel, longitudinally extending flexible straps 14, each having a buckle 16 at one end, and a flexible second pad 18 which is longitudinally spaced from the first pad 12 and connected thereto by means of the straps 14. The purpose of the first pad 12 is to support the tire to be repaired and all other equipment used in the repair. The purpose of the second pad 18 is to protect the tire and the equipment from damage by buckle 16.

FIG. 1 also shows a first inflatable air bag 20, of generally rectangular shape and having a hose 22 for connection to a source of air under pressure. FIG. 1 also shows a first heating pad 24, also of generally rectangular shape. The electric wire connecting this heating pad to a power source is now shown in FIG. 1.

FIG. 2 shows a pair of mandrel halves 30, 32, having the same size and shape, but mirror images of each other. Together these two halves form a mandrel. Each mandrel half is a rigid solid of somewhat irregular shape, comprising a top surface 34, a generally convex outside (or first side) surface 35, an essentially flat (or planar) inside (or second side) surface 36, a bottom surface 37, and two ends 38. The top surface 34 is preferably flat as shown, but may be slightly concave and of circular curvature, corresponding to the curvature of the bead portion of a tire. The convex outside surfaces 35 have curvatures which correspond to curvatures of the inside of the sidewall of a tire from the bead portion extending toward the shoulder and tread. The inside surfaces 36 of mandrel halves 30 and 32 are flat; these surfaces of the respective mandrels halves 30 and 32 are in contact with each other in an assembly of equipment used in the repair method of this invention. Bottom surfaces 37 may be either flat or (preferably) slightly convex. These surfaces are in contact with an air bag when all equipment used in the method herein has been assembled. Finally, ends 38 are preferably vertical and flat although their shape is not critical.

Figures 1, 2:
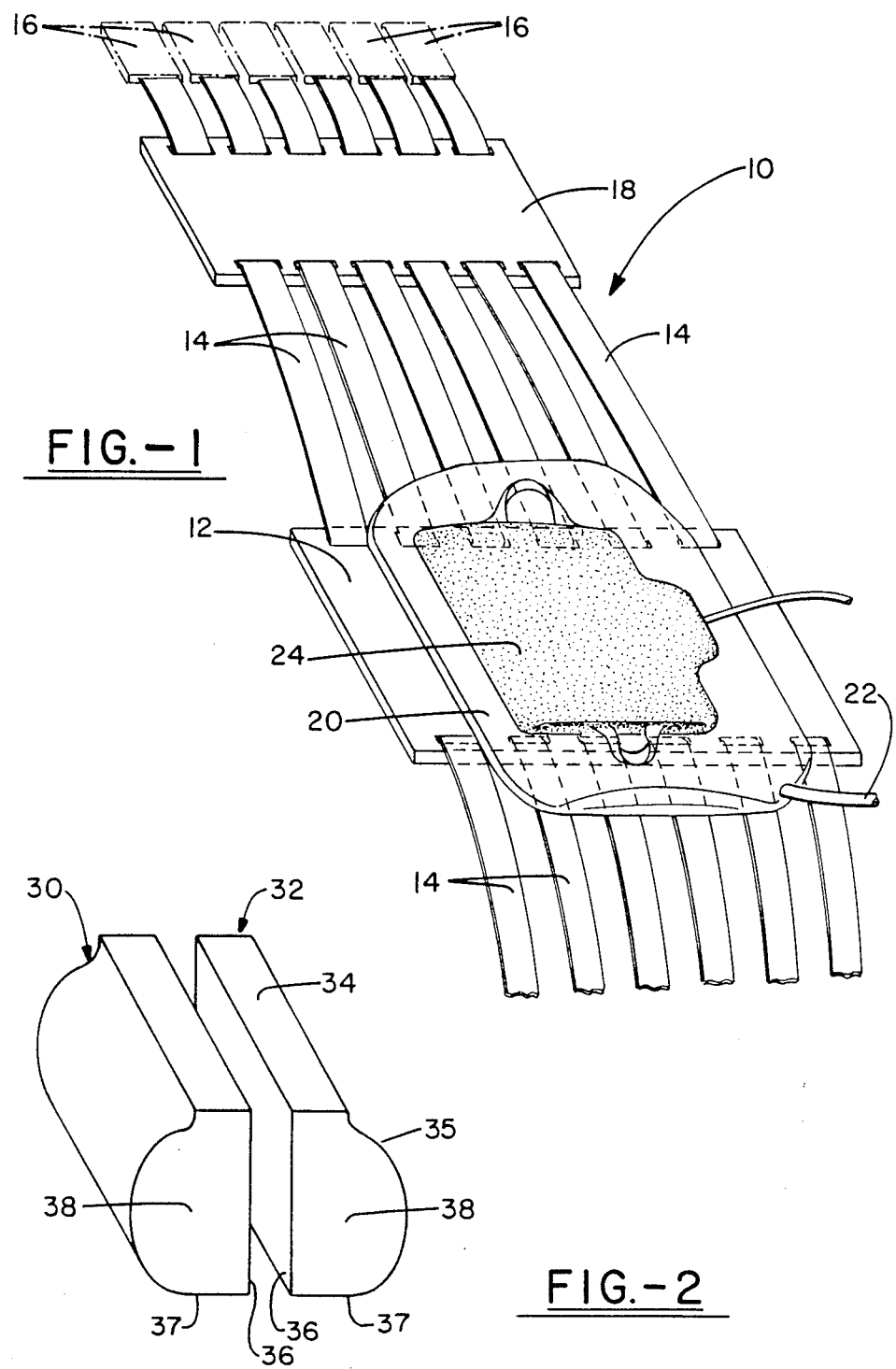
FIG. 1 shows a harness for use in the present invention.
FIG. 2 shows a pair of mandrel halves for use in the present invention.

Mandrel halves 30, 32 are preferably of a rigid polyurethane foam. Whether solid or hollow (solid is preferred), mandrel halves 30, 32 must be rigid and must be able to withstand operating temperatures up to about 310° F. (slightly higher than the preferred vulcanization temperature, which is 280° F.)

Mandrel halves 30–32 according to this invention are preferably provided in a set comprising a plurality of mandrels of different sizes, to fit the various size of tires which may be repaired. This set includes two halves forming a mandrel of each size, since halves of the same size are used together. For any given repair job, one selects a mandrel (i.e. two mandrel halves) of the size most which most nearly conforms to that of the tire to be repaired. Generally the width of the tire from one sidewall to the other is the determining factor in size selection.

To repair a tire according to this invention, one carries out the following steps in the order given:

1. Place the harness 10 on the floor or other hard, essentially horizontal supporting surface, making sure that the rubber strap guides 14 will be aligned with the tread of the tire. When the area of the tire to be repaired is off center, (i.e., not on the center plane of the tire which is perpendicular to the axis of rotation), which is usually the case, buckles 16 are placed on the side opposite that of the repair area so that the buckles will not puncture the air bag.

2. Place the air bag 20 and the heating pad 24 centrally across the harness 10 so that they are aligned with the repair area. Longitudinal direction of the air bag and heating pad should be the same as the longitudinal direction of the harness. Make sure that the air bag valve (not shown) is positioned away from the tire and not under a harness strap. Place the heat pad power cord (not shown) and handles parallel with the tread of the tire. The heating pad should be covered with a suitable tire and air bag paint designed to prevent vulcanization of the heating pad to the uncured rubber of the patch compound. This must be done before the tire is put in place.

Figure 3:
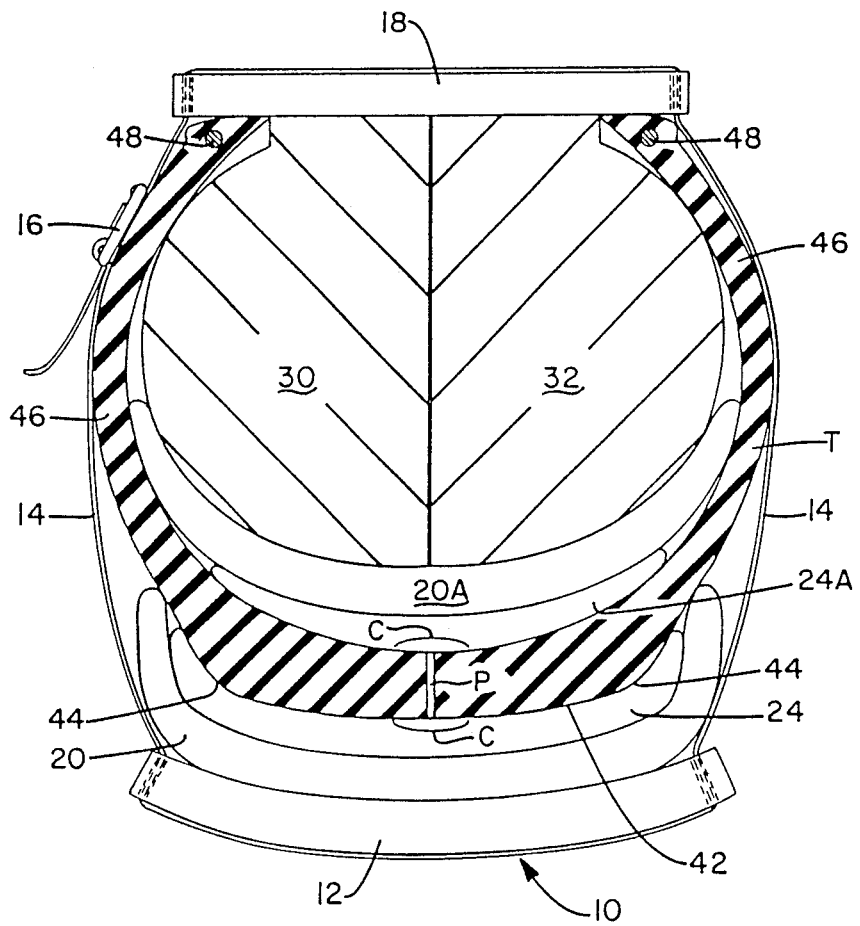
FIG. 3 shows a cross-sectional view of a tire to be repaired and an assembly for lay-up for repairing that tire according to this invention.

3. Position the tire atop the harness 10, air bag 20 and heating pad 24 so that the center plane of the tire (which is perpendicular to the axis of rotation of the tire) is perpendicular to the longitudinal direction of the harness/air bag/heating pad assembly formed thus far. In other words, the axis of rotation of the tire is parallel to the longitudinal direction of the assembly. This assembly, together with a second heating pad 24A, and a second air bag 20A and (2) two halves of mandrels 30, 32 which are placed inside the tire, may be seen in FIG. 3. In FIG. 3, T denotes a tire to be repaired; this tire has a puncture P which defines the repair area. This tire is assumed to be of conventional structure comprising a tread 42, shoulders 44, sidewalls 46, and beads 48. The portion of the tire in the vicinity of the beads (e.g., the portion of the carcass from the widest part of the tire to the beads 48) may be considered the bead portion of the tire.

4. Place a second or inside heat pad 24A directly over the repair area, which includes puncture P and patch compound C on either side of the tire in the vicinity of the puncture. Make sure that the heating pad 24A is big enough to cover the repair area. Heating pads 24, 24A may be of the same size, but should adequately cover the area to be repaired. The surface of the heating pad next to the tire T must be painted with an appropriate tire and air bag paint prior to putting the second heating pad 24 in place, in order to prevent vulcanization of the heating pad to the tire.

5. Place the inside air bag 20A over the heating pad with the valve stem of the air bag out of the tire and above the beads 48, free of obstruction.

6. The two filler mandrel halves 30, 32 are now inserted. One mandrel half 30 (which will lie over the repair area, when the repair area is off center) is inserted first. This mandrel half is placed against the air bag 20A and one tire sidewall 46. Then the second mandrel half 32 is inserted. It may be necessary to pry the two beads 48 apart temporarily for insertion (equipment for this purpose is conventional in auto repair garages). The two mandrel halves 30, 32 should be positioned so that the respective inside faces 36 are squarely aligned with each other. When this is done, the second mandrel half 32 will also be in contact with its tire sidewall 46 and the air bag 20A. If the mandrel fits too loosely in the tire cavity, the next larger size of tire mandrel should be used.

7. The harness 10 is now brought into position, with the harness straps 14 overlying the outside of the sidewalls of the tire, as shown in FIG. 3. The free end of each strap is buckled to the corresponding buckle 16, starting with the strap nearest the center. Pad 18 overlies mandrels 30, 32 and the bead portions. The assembly should be snug but not completely tight after all straps have been fastened.

Figure 4:
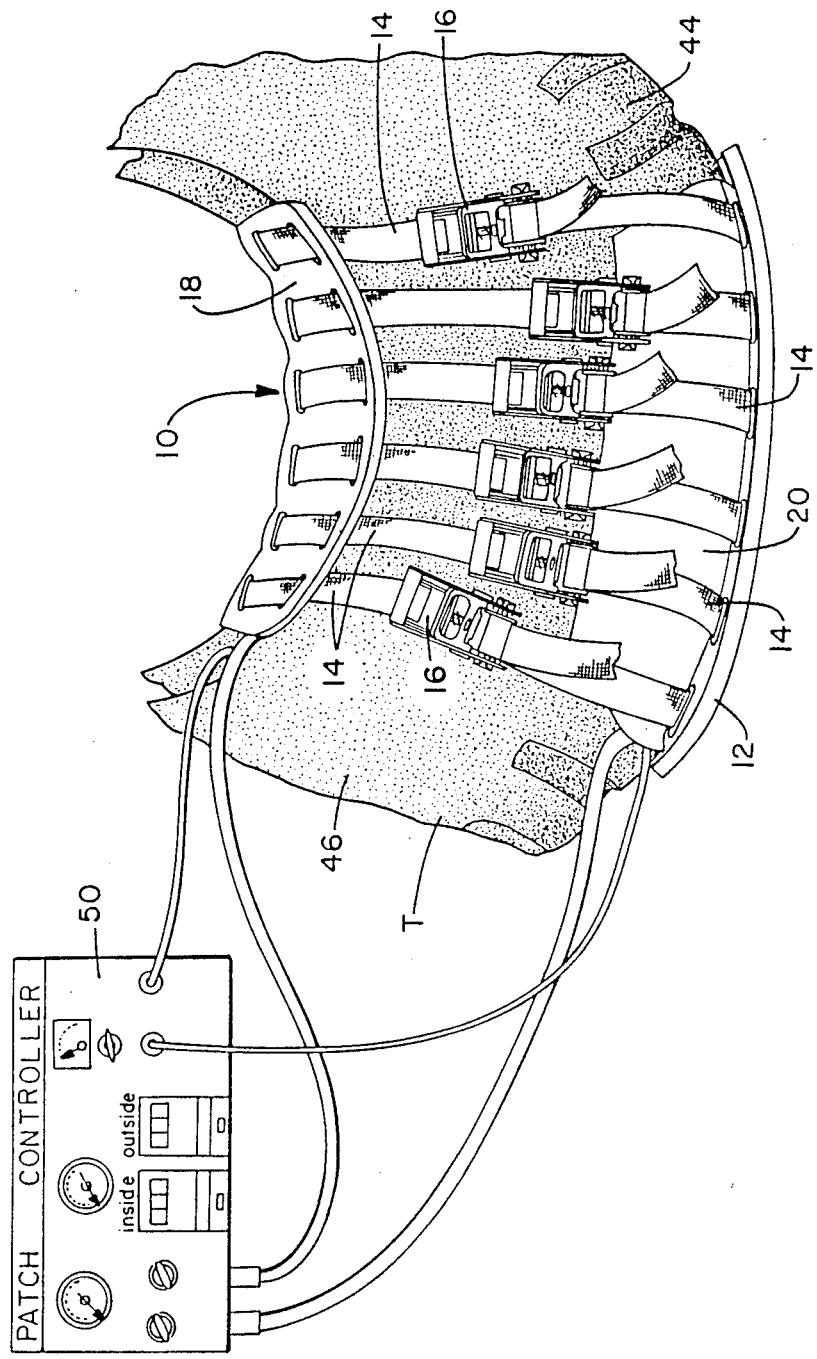
FIG. 4 shows an elevational view showing a harness, an air bag, a heating pad and a source of heat and air according to this invention.

The air bags are pressurized, the inside air bag 20A being pressurized to 10 psi before the outside air bag 20 is inflated. The inside air bag should be inflated to 30 psi and the outside bag to 27 psi. The air pressure may be supplied and controlled by means of controller 50 as shown in FIG. 4.

9. After electrical connections between the heating pads 24, 24A and the controller 50 have been made, the current is caused to flow to heat the patch compound C to vulcanization temperature, preferably not exceeding 280° F., for sufficient time to cause curing or vulcanization. Controller 50 may have a timer for this purpose. Thermocouples (not shown) on both the inside and the outside heat pads control temperature.

10. After curing has been completed, turn power off and disconnect air lines, allowing time for the inside and the outside air bags to deflate. Disassemble in the exact reverse of assembly. Where possible, allow the tire to cool to essentially ambient temperature before air pressure is released. This is desirable for best patch quality.

The repair method of this invention, and the equipment used therein, give highly reliable results at reasonable cost. While only a preferred embodiment of the invention has been illustrated and described in detail it is to be understood that the invention is not limited thereto or thereby, such as modification of size or shape of mandrels, but that the invention is set forth in the appended claims.

What is claimed is:

1. A method for repairing a tire which comprises:
   (a) placing on an essentially horizontal supporting surface a harness having a pad;
   (b) placing an air bag and a heat pad in that order on top of the harness pad;
   (c) positioning a tire to be repaired on top of said harness, air bag and heat pad so that the area of the tire to be repaired is over said heat pad, said area to be repaired having an uncured patch composition applied thereto;

(d) placing on the inside of the tire, over the area to be repaired, a second heat pad, a second air bag and a pair of complementary mandrel halves in the order named thereby forming an assembly of said harness, air bags, heat pads and mandrel halves in which said mandrel halves together extend from one sidewall to the other sidewall of the tire, said mandrel halves being of the same size each mandrel half comprising (1) a top surface, (2) a bottom surface, (3) a convex first side surface extending from said top surface to said bottom surface and having a contour essentially corresponding to that of the inside surface of the sidewall of said tire, (4) a second side surface extending from said top surface to said bottom surface, and (5) a pair of end surfaces, the respective second side surfaces being in contact with each other when said mandrel halves are placed on the inside of said tire, said mandrel being essentially rigid and capable of withstanding vulcanization temperature and pressure;

(e) securing the resulting assembly of said harness, air bags, heat pads and mandrel halves snugly; and (f) applying heat and pressure sufficient to cure said patch composition so as to repair the tire.

2. A method as claimed in claim 1 wherein said heat is applied electrically.

3. A method as claimed in claim 1 wherein said tire comprises a tread, side walls and bead portions and wherein the top surface of each mandrel half has a radius of curvature corresponding to that of the bead portions of the tire.

4. A process according to claim 1 wherein said bottom surfaces are in contact with said second air bag when said mandrel has been placed on the inside of said tire.

5. A method according to claim 1, wherein said mandrel halves are selected by selecting a pair of complementary mandrel halves of the same size and shape from a set of mandrels of different sizes but similar shapes, each of said mandrels being essentially rigid and comprising a pair of complementary mandrel halves of the same size and shape.

* * * * *